(12) United States Patent
Hudson

(10) Patent No.: US 6,230,980 B1
(45) Date of Patent: May 15, 2001

(54) VENTILATION CONTROLLING APPARATUS

(75) Inventor: Raymond John Hudson, Henley-on-Thames (GB)

(73) Assignee: Ray Hudson Limited, Henley-on-Thames ( * ) Notice: Subject to any disclaimer, the term of this patent is extended or adjusted under 35 U.S.C. 154(b) by 0 days.

(21) Appl. No.: 09/242,085

(22) PCT Filed: Aug. 8, 1997

(86) PCT No.: PCT/GB97/02155

§ 371 Date: Sep. 7, 1999

§ 102(e) Date: Sep. 7, 1999

(87) PCT Pub. No.: WO98/07083

PCT Pub. Date: Feb. 19, 1998

(30) Foreign Application Priority Data

Aug. 9, 1996 (GB) .................................................. 9616699
Nov. 11, 1996 (GB) .................................................. 9623525
Dec. 31, 1996 (GB) .................................................. 9627135

(51) Int. Cl.$^7$ .................................................. G05D 22/02
(52) U.S. Cl. .................. 236/44 A; 236/446; 236/49.3; 454/256
(58) Field of Search .................. 236/44 R, 44 A, 236/44 C, 44 E, 49.1, 49.3; 454/256, 258, 229, 239; 165/248, 249, 222, 223, 224, 225, 226, 227, 228, 229, 230; 62/176.1, 176.4, 176.6

(56) References Cited

U.S. PATENT DOCUMENTS

| 4,312,189 | * | 1/1982 | Cotton, Jr. .................. 236/44 A X |
| 4,700,887 | * | 10/1987 | Timmons .................. 236/44 C X |
| 4,953,784 | | 9/1990 | Yasufuku .................. 236/44 A |
| 5,232,152 | | 8/1993 | Tsang .................. 236/44 A |
| 5,346,129 | * | 9/1994 | Shah et al. .................. 236/44 C |
| 5,351,855 | * | 10/1994 | Nelson et al. .................. 236/44 C |
| 5,428,964 | * | 7/1995 | Lobdell .................. 236/44 C X |
| 5,482,210 | * | 1/1996 | Carey et al. .................. 236/49.3 |
| 5,675,979 | * | 10/1997 | Shah .................. 62/176.6 |

FOREIGN PATENT DOCUMENTS 2209070 4/1989 (GB) .
96/09576 * 3/1996 (WO) .

* cited by examiner

Primary Examiner—Harry B. Tanner
(74) Attorney, Agent, or Firm—Robert W. J. Usher

(57) ABSTRACT

Apparatus for controlling air moisture utilises a humidity sensor to produce an electrical signal indicative of air humidity. The signal provides input to a microprocessor which stores humidity values indicated by the signal and also uses the signal to compile a humidity reference base which may be derived from a time average of the relative humidity and, optionally, the current value thereof. The microprocessor further provides an output air moisture control signal when the sensed humidity exceeds the reference base by a predetermined amount.

12 Claims, 2 Drawing Sheets

VENTILATION CONTROLLING APPARATUS

This invention relates to apparatus for ventilating a building or a room space and to a humidity sensitive control device responding to Relative, Absolute or Specific humidity for such apparatus. The ventilating apparatus can be a extractor fan, positive pressure fan, air heat recovery using simultaneous intake and extract of air or any device able to dry and or change the moisture content of the air and require control based on the water content in the air. The ventilation apparatus to displace the existing air and thereby effect the water content by dilution of the air with the make up air.

It is the object of this invention to provide quantitative control of a ventilation system based on assessment of the water content of air.

It is known to provide buildings, or rooms within buildings, with ventilation apparatus including a humidity-sensitive control apparatus, arranged to activate the ventilation apparatus. Examples of mechanism available to determine this activation are as follows, a) only when the interior humidity level is above a predetermined threshold (conventional humidistat)

b) detection of rate of change of increase in humidity (GB 2 133 588)

c) proportional extract ventilation rate in response to humidity level above a predetermined threshold (conventional variable speed fan with humidity controller)

d) Detection of humidity with temperature change compensation (conventional humidistat technology in general use since 1983 —known as night time set back).

e) Sampled, averaged and stored humidity level establishing a predetermined humidity threshold above this level (part of current invention).

All the above examples use the Relative Humidity (RH) scale to determine a level when to operate ventilation equipment. This is fraught with problems arising from the RH scale itself which gives a value of water content (usually as a %) in relation to temperature, this giving an indicator of air saturation by moisture content. By way of example cooking and tumble dryers produce copious amounts of water vapour, however a local %RH controller would only register a slight increase in %RH or in some cases a reduction of %RH, this is due to the simultaneous increase in temperature causing the air to hold more moisture and therefore not give cause to a rise in %RH. Other factors include changes in weather conditions causing fluctuations of ambient humidity and temperature, and geographic locations such as near the sea, lakes, rivers and within valleys.

Controllers that monitor only current or memorise one off readings of Relative Humidity such as GB 2 133 588 and GB 2 298 057 produce a nomadic response, as at the moment of sensing a variety of influences effect these one off readings; Weather changes including pressure, temperature, and moisture content of air. Gradual changes of humidity and temperature. Fast short peaks of moisture (such as a kettle boiling below a sensor) or slow moisture production (such as clothes drying).

Controllers relying on the %RH scale require large tolerances in the setting of the control levels due to the effects of changing temperature and pressure. As the existing controllers are not relying on the water content increase of the air alone, erratic control results. The control is not quantitative in relation to the water production to which it is meant to control. The results to the user are irritating as they either have equipment running too long too short or not at all, and apparently not duplicating previous control times.

Absolute and specific Humidity levels provide for true assessable levels of the moisture content of air, a rise in moisture level would always cause a rise in absolute humidity and at a constant pressure, a rise of specific humidity.

A direct relation between Relative Humidity and Absolute Humidity can be achieved by not including the temperature aspect (measurement) when the sensor detects humidity or by way of the example compensating a RH sensor with a temperature sensor and calculating the Absolute Humidity in grams of water per meter cubed of air.

A further more accurate humidity assessment is achieved by using an air pressure sensor in conjunction with the Absolute Humidity level providing a Specific Humidity reading of grams of water per Kilogram of air.

According to the invention a ventilation controlling apparatus comprising a humidity sensor operable to produce an electrical signal the level of which is determined by the humidity of air at the sensor, and microprocessor electrical circuitry coupled to the sensor, wherein said microprocessor stores the humidity, the average of the hunmidity reading is calculated over a period of time the value of which average acts as a reference base of humidity, then when the measured humidity exceeds the reference base of humidity by a predetermined amount said microprocessor means is arranged to provide a ventilation output control signal.

This invention is characterised by a ventilation controlling apparatus which has a variable reference point based on sampled humidity levels and to a means of determining a reliable humidity reading to achieve the length of period a ventilation apparatus should operate following activation. The sampled humidity levels being converted and stored as any of the following, 1. % Relative Humidity
2. Absolute Humidity
3. Specific Humidity The processor operates the ventilator by relay when certain humidity conditions are met. Humidity readings are taken from continuous small sampling periods the average of each sampling period is the basic input for all humidity readings stored in the memory of the microprocessor. The processor software calculates the humidity average value over a further given period which providing a base reference, When the humidity increases above a set threshold level above the base reference the ventilation apparatus is activated. A second set of humidity readings occurs after activation of the ventilation apparatus. The humidity difference from the base reference and the average of the second set of humidity reading provides the basis to calculate the total running time of the ventilation apparatus. Subject to the humidity not returning to the reference base level in which case the ventilator will be deactivated.

Ventilation apparatus in accordance with the present invention is characterised by a ventilation controlling apparatus which has a variable reference point based on a set of sampled humidity levels such an apparatus is more sensitive to humidity control requirements and is more universally adaptable than apparatus relying solely on a humidity level or rate of change of humidity level. In its preferred form the apparatus can successfully discriminate from household humidity production and that from weather change, and temperature change, It is able to detect humidity produced slowly, i.e. that caused by clothes drying and humidity produced in a large room, that is humidity levels just above ambient humidity.

The ambient humidity(Reference base) being defined by the controller from an average of humidity samples taken by the controller over a period of time.

A second set of humidity readings(Relevant Humidity) are taken the average of which are compared with the reference base. The difference in these readings provides a basis to calculate the ventilator running times.

This Relevant Humidity value provides a level obtained when the ventilation system (whatever its efficiency) is operating and when the humidity source status is obtained, as such a humidity level taken at this time has a direct relationship between the efficiency of the extraction source and the humidity producing source (although this source can be variable). Determination of a ventilator control period at the time of this second humidity reading provides a basis for the anticipated control period. The relevant humidity value is obtained shortly after operation, typically three minutes, this is sufficiently short a period to discount ambient changes due to weather and geographic position. At this time the vapour diffusion levels to cooler parts of the building are being contained as much as possible by the ventilator under control.

In its preferred form the apparatus can successfully determine control periods and thereby optimise the ventilation unit for efficiency and condensation control.

A ventilation control apparatus including a control unit and ventilator in accordance with the present invention, will now be described, by way of example, with reference to the accompanying drawings, in which.

Figure 3:
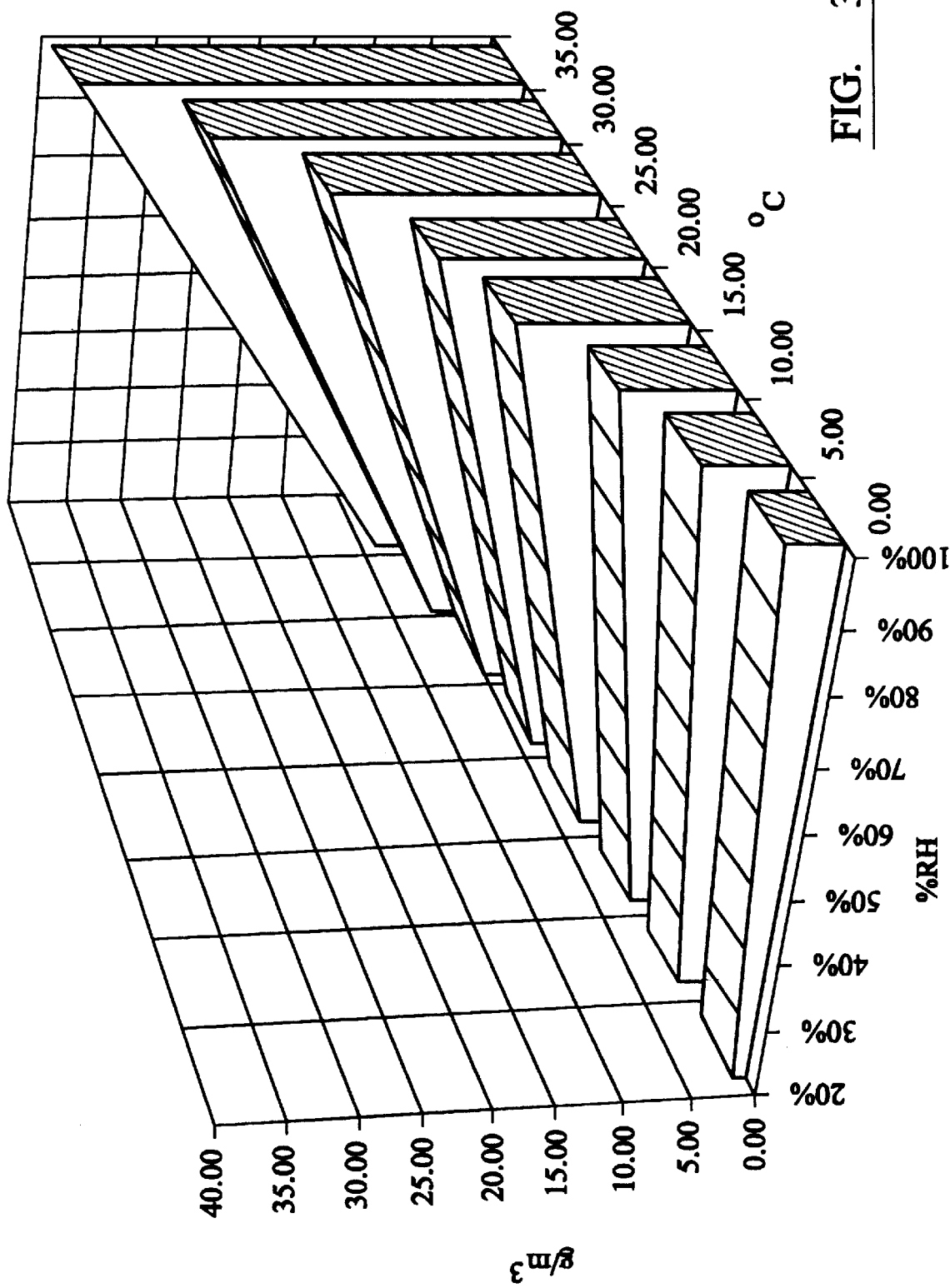

FIG. 3 illustrates the relationship between % Relative Humidity—Absolute Humidity and Temperature The ventilation controlling apparatus comprises an extractor fan [1] mounted in an external wall or window of a conventional domestic dwelling, close to the moisture sources in either the kitchen or bathroom. The extractor fan [1] is electrically powered and connected by wire to the output relay [9] of the control unit [11]. The control unit [11]includes a microprocessor [6], probe sense amplifier [3], probe log converter [4], analogue to digital converter [5], Relay [9] and LED status indicator [8], and is connected to thermistor [7] and humidity sensor [2].

The sensed Humidity is continually supplied to the microprocessor via probe sense amplifier [3], the probe log converter [4] and A to D converter [5]. The microprocessor programming converts the Humidity readings to Absolute humidity with as required the temperature input from the thermistor, readings from the humidity sensor are averaged over 30 seconds this average value is then supplied for memory storage, these readings are then stored for two hours the average over this two hour period is used as the base reference. The base reference is updated every two hours with the average of the absolute humidity reading taken over the preceding two hour period. During activation periods of the extractor fan humidity readings for the base reference are suspended, this is to avoid spurious ambient readings during the desiccation period.

A threshold level of absolute humidity above the base reference is chosen sufficiently high to avoid ambient humidity variations that could occur over a two hour period but low enough to activate the ventilator with moisture production. The Absolute Humidity threshold level is altered at different temperatures, as shown in Table 1 below.

Once the Absolute humidity has gone above the threshold the ventilator is activated, after three minutes of activation the Absolute Humidity level is again compared with the base reference level, the level of Absolute humidity above this base will determine the total running time as shown in Table 2 below.

Note the controller can be set to operate for double the period expressed in Table 2 when used with less efficient ventilation systems such as air heat recovery and positive air pressure systems. This is achieved by cutting link [12] which adjusts the microprocessor program.

If at any time during ventilator activation the absolute humidity level falls to the same or less than the base reference level then the activation period is suspended.

If at the end of a time activation period the Absolute Humidity is above the Threshold level then a further activation is activated as shown in Table 2.

Figure 2:
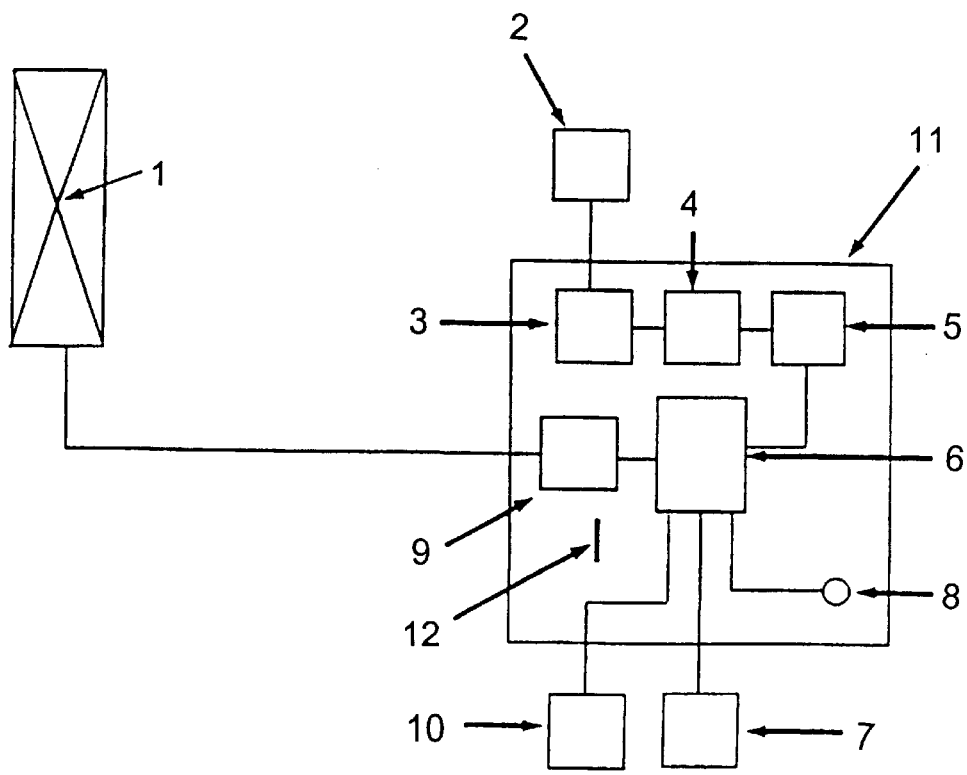
FIG. 2 shows the system schematically for specific humidity.

Specific Humidity Controller as FIG. 2, Operation as Absolute Humidity Controller with Pressure input compensating for atmospheric changes of pressure.

Figure 1:
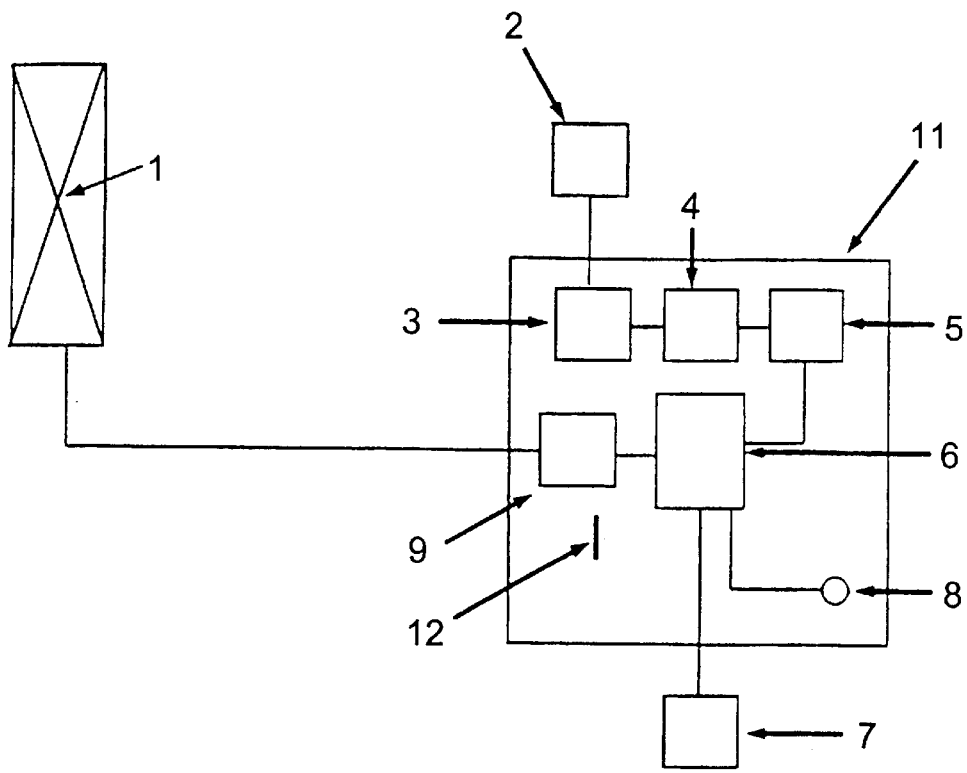
FIG. 1 shows the system schematically.

Relative Humidity as FIG. 1, Operation as Absolute Humidity Controller without thermister input. With the following control; The %RH is stored over the two hour period and used as the base reference (being updated every two hours). The base reference is compared with humidity samples taken after 3 minutes of ventilator operation (this sample taken over 30 seconds and then averaged). The difference %RH between the base average and the sample after 3 minutes is used to calculate total running, time.

For general extraction this would equate to 2×% Relative Humidity(%RH) difference =number of minutes the extractor operates For ventilation units such as positive pressure or air heat recovery the minimum operation periods would be double, i.e. 4×% Relative Humidity difference =number of minutes of ventilation.

TABLE 1

RUNNING TIME CALCULATION BASED ON ABSOLUTE HUMIDITY LEVEL 3 MINUTES AFTER VENTILATOR OPERATION = C × D

| Temperature Range ° C. A | Threshold level above ref.: B g/M3 of H2O in air | Level above threshold C g/M3 of H2O in air | Multiplication number D | Running time Minutes |
|---|---|---|---|---|
| 0–5 | 0.10 | | 30.00 | C × D |
| 5–10 | 0.20 | | 20.00 | C × D |
| 10–15 | 0.30 | | 10.00 | C × D |
| 15–20 | 0.40 | | 7.50 | C × D |
| 20–25 | 0.50 | | 6.00 | C × D |
| 25–30 | 0.60 | | 5.00 | C × D |

TABLE 1-continued

RUNNING TIME CALCULATION BASED ON ABSOLUTE
HUMIDITY LEVEL 3 MINUTES AFTER VENTILATOR
OPERATION = C × D

| Temperature Range ° C. A | Threshold level above ref.: B g/M3 of H2O in air | Level above threshold C g/M3 of H2O in air | Multiplication number D | Running time Minutes |
|---|---|---|---|---|
| 30–35 | 0.80 | | 4.00 | C × D |
| 35> | 1.00 | | 3.00 | C × D |

TABLE 2

TEMPERATURE VS ABSOLUTE HUMIDITY THRESHOLD
CONTROL ABOVE BASE REFERENCE OF ABSOLUTE HUMIDITY

| Temperature Range ° C. A | Water Content B g/M3 of H2O | Multiplication No. C X | Set level above ref: D g/M3 of H2O in air |
|---|---|---|---|
| 0–5 | 0.05 | 1 | 0.10 |
| 5–10 | 0.05 | 2 | 0.20 |
| 10–15 | 0.05 | 3 | 0.30 |
| 15–20 | 0.05 | 4 | 0.40 |
| 20–25 | 0.05 | 5 | 0.50 |
| 25–30 | 0.05 | 6 | 0.60 |
| 30–35 | 0.05 | 8 | 0.80 |
| 35> | 0.05 | 10 | 1.00 |

A = Temperature range
B = Absolute Humidity threshold level

KEY FOR FIG. 1

A control for ventilation apparatus 1, humidity sensor 2 the output of which are amplified by probe sense amplifier 3 this output is supplied to probe log converter 4 which is then supplied to the Analogue to Digital converter 5 this digital information then supplied to the microprocessor 6. Thermistor 7 connected to microprocessor 6.

The processor operates the ventilator by relay 9 when certain absolute humidity condition are met. The processor calculates the absolute humidity the average value over a given period is used as a reference, when the absolute value of humidity increases above a given threshold above this reference ventilation apparatus 1 is activated. A further humidity reading after a given time is taken while the ventilation apparatus 1 has been activated, the humidity difference from the reference and this further reading provides the basis to calculate the actual total running time of the ventilation apparatus 1.

KEY FOR FIG. 2

A control for ventilation apparatus 1, humidity sensor 2 the output of which are amplified by probe sense amplifier 3 this output is supplied to probe log converter 4 which is then supplied to the Analogue to Digital converter 5 this digital information then supplied to the microprocessor 6. Thermistor 7 and pressure transducer 10 are connected to microprocessor 6.

The processor operates the ventilator by relay 9 when certain specific humidity condition are met. The processor calculates the specific humidity the average value over a given period is used as a reference, when the absolute value of humidity increases above a given threshold above this reference ventilation apparatus 1 is activated. A further humidity reading after a given time is taken while the ventilation apparatus 1 has been activated, the humidity difference from the reference and this further reading provides the basis to calculate the actual total running time of the ventilation apparatus 1.

What is claimed is:

1. Air moisture controlling apparatus comprising a humidity sensor operable to produce an electrical signal the level of which is determined by the humidity of air at the sensor, and microprocessor means coupled to the sensor whereby to receive said signal, in which the microprocessor means is arranged to provide an output air moisture control signal when the measured humidity exceeds a reference base of humidity by a predetermined amount; wherein the microprocessor stores humidity values indicated by the sensor signal, calculates an average value over a time period, and uses the calculated average as the said reference base of humidity.

2. Air moisture controlling apparatus according to claim 1, wherein the microprocessor means compares a second humidity reading, taken after a significant period following provision of said air moisture output control signal, with the reference base of humidity, and the difference in humidity levels provides a calculation basis for the duration of the air moisture output control signal.

3. Air moisture controlling apparatus according to claim 2, wherein the second humidity reading is taken in a small sampling period after the said significant period following provision of the air moisture output control signal.

4. Air moisture controlling apparatus according to claim 1, wherein said microprocessor means stores and averages the humidity in small sampling periods, compiles the average of the humidity readings in these small sampling periods over a longer time period the average of which acts as a reference base of humidity, and when the average value of humidity in the current small sampling period exceeds the reference base of humidity by a predetermined threshold said microprocessor means is arranged to provide said air moisture output control signal.

5. Air moisture controlling apparatus according to claim 1, wherein the output air moisture control signal is adapted to deactivate air moisture control if the measured humidity decreases to the reference base of humidity.

6. Air moisture controlling apparatus according to claim 1, wherein said microprocessor means is arranged to detect store and calculate based on the Absolute Humidity, the humidity readings from the humidity sensor being adjusted as required by readings from a temperature sensor to match the characteristics of the humidity sensor used.

7. Air moisture controlling apparatus according to claim 1, wherein said microprocessor means is arranged to detect store and calculate based on the percent Relative Humidity, the humidity readings from the humidity sensor being adjusted as required by readings from a temperature sensor to match the characteristics of the humidity sensor used.

8. Air moisture controlling apparatus according to claim 1, wherein said microprocessor means is arranged to detect store and calculate based on the Specific Humidity, the humidity readings from the humidity sensor being adjusted as required by readings from a temperature sensor and from an air pressure sensor to match the characteristics of the humidity sensor used.

9. Air moisture controlling apparatus according to claim 1, wherein the output control signal is supplied to ventilating apparatus.

10. Apparatus for changing the moisture content of air in a building or room space, having control means comprising air moisture controlling apparatus according to claim 1.

11. Air moisture controlling apparatus comprising a humidity sensor operable to produce an electrical signal the level of which is determined by the humidity of air at the sensor, and microprocessor means coupled to the sensor whereby to receive said signal, in which the microprocessor means is arranged to provide an output air moisture control signal when the measured humidity exceeds a reference base of humidity by a predetermined amount; wherein the microprocessor stores humidity values indicated by the sensor signal, and derives the said reference base of humidity from the stored humidity values.

12. Air moisture controlling apparatus according to claim 1, wherein the humidity reference base is compiled by the microprocessor from both the averaged stored reference value of relative humidity and the currently sensed value of relative humidity.

* * * * *